United States Patent [19]

Binz et al.

[11] 4,455,648

[45] Jun. 19, 1984

[54] TIME DIVISION MULTIPLEX SWITCHING NETWORK UNIT

[75] Inventors: Reiner Binz, Hohenschaeftlarn; Eberhard Knorpp, Gauting; Frithjof von Sichart, Munich, all of Fed. Rep. of Germany

[73] Assignee: Siemens Aktiengesellschaft, Berlin & Munich, Fed. Rep. of Germany

[21] Appl. No.: 345,595

[22] Filed: Feb. 4, 1982

[30] Foreign Application Priority Data

Mar. 13, 1981 [DE] Fed. Rep. of Germany ....... 3109808

[51] Int. Cl.³ .............................................. H04J 3/00
[52] U.S. Cl. ........................................ 370/66; 370/58
[58] Field of Search ..................... 370/58, 59, 61, 66, 370/68

[56] References Cited

U.S. PATENT DOCUMENTS

| | | | |
|---|---|---|---|
| 4,071,701 | 1/1978 | Leisonhufvud et al. | 370/66 |
| 4,131,763 | 12/1978 | Herschtal | 370/66 |
| 4,320,501 | 3/1982 | Le Dieu et al. | 370/63 |
| 4,386,425 | 5/1983 | Belforte et al. | 370/66 |

OTHER PUBLICATIONS

Beesley J. H., "Practical Multi-Stage Switching Networks", 1972 Zurich Seminar on Digital Communications, pp. B4(1)-B4(5).

Primary Examiner—Douglas W. Olms
Assistant Examiner—Frank M. Scutch, III
Attorney, Agent, or Firm—Hill, Van Santen, Steadman & Simpson

[57] ABSTRACT

In switching network units which operate employing an information memory featuring cyclic input and random reading, the number of connections is particularly limited by the fact that during random reading it is not possible to exceed a specific speed. They are normally designed in such a manner that, to a full extent, they can effect both time-wise switching and spatial switching. In these units, the speed restriction during random reading means that the number of connections normally cannot exceed a certain value. Moreover, the facility of time channel conversion to a full extent in units of central switching stages represents an unnecessary expense. Such units are therefore constructed from a plurality of identical modules whose equivalent inputs are connected to one another and into which, during each pulse frame, more PCM words are input than PCM words are stored therein or can be read in random therefrom. Therefore, the time shifts which can be achieved serve primarily for purposes of spatial assignment, although the expense in comparison to the full time-spatial switching units is lower and a larger number of incoming lines can be connected without exceeding the permissible reading speeds.

5 Claims, 2 Drawing Figures

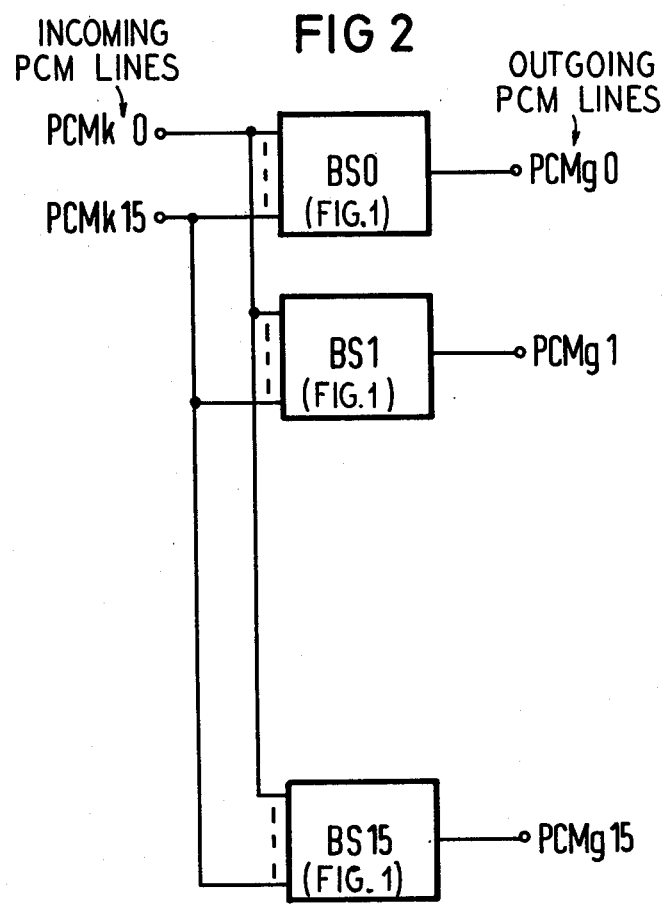

TIME DIVISION MULTIPLEX SWITCHING NETWORK UNIT

CROSS REFERENCE TO RELATED APPLICATION

This application is related to an application, Ser. No. 345,596, filed Feb. 4, 1982.

BACKGROUND OF THE INVENTION

1. Field of the Invention

The present invention relates to a time division multiplex (TDM) switching network unit for the connection of a plurality of pulse code modulation (PCM) lines, which facilitates an assignment of time channels employed on PCM lines for the incoming direction of transmission to time channels used on PCM lines for the outgoing direction of transmission by the cyclic input of the incoming PCM words into the storage cells of an information memory, and by random reading of the outgoing PCM words from such storage cells.

2. Description of the Prior Art

Known TDM switching network units serve to establish both a spatial assignment and a time assignment between time channels on PCM lines for the incoming direction of transmission and time channels on PCM lines by the outgoing direction of transmission, and therefore they exert the function of a combined time-space stage.

From the point of view of expense, it would be most favorable to construct an entire switching network by a single switching network unit of this kind.

However, both in respect of technology and operating conditions, it is not readily possible to exceed a specific value of the number of connections which applies, in particular, when such switching network units are to be constructed in integrated circuitry.

Switching networks which are to be connected to more PCM lines than terminals exist in a switching network unit and which, accordingly, comprise a plurality of switching network units, can be designed as a single-stage or a multi-stage arrangement. In a known single-stage arrangement (Commutation & Electronique, No. 40, January 1973, Page 14–40) the switching network comprises at least two single-stage switching network components, each of which possesses as many switching network units as there are switching network components, and wherein the TDM lines for the incoming direction of transmission which are connected to the switching network units are also connected to one input of the switching network unit of each other switching network component. When the switching network is designed in this manner, however, the increase in the number of connections leads to a quadratic increase in the number of switching network units which are used.

At least from the point of view of the expense, in terms of requisite switching network units, the aforementioned multi-stage switching networks are more favorable. With respect to blocking-free operation, it is sufficent, in multi-stage switching networks of this kind, that time channel conversions should be possible in the input end stage and in the output end stage. On the other hand, the intermediate stages can represent pure space-switching stages. Consequently, the construction of a multi-stage switching network purely from identical switching network units which, as stated above, can result fully both in a spatial assignment of time channels and in a time-wise assignment of time channels represents an unnecessary expense.

Therefore, on the one hand, there is an interest in switching network units which represent pure spatial switching stages, but which, from the technological viewpoint, largely conform with the aforementioned time-space stages which operate on the basis of time shifts.

Multi-stage switching networks constructed employing switching network units are more favorable, from the stand-point of expense in switching network units, than the aforementioned single-stage switching networks, although they result in longer switch-through transit times and in a larger expense in the setting-up control system.

Therefore, interest also exists in spatial switching units of the above-mentioned type, wherein it is possible to connect a larger number of PCM lines than was previously the case for the above-given reasons, so that even when a multi-stage construction is needed it is at least possible to keep the number of stages low.

SUMMARY OF THE INVENTION

Therefore, the object of the present invention is to provide a TDM switching network unit of the type generally referred to above which operates as a spatial switching unit and wherein, even in the case of an integrated circuitry design, it is possible to connect a larger number of PCM lines than was previously the case.

In accordance with the present invention, the above object is realized in a TDM switching network unit of this kind in that the latter comprises a plurality of identical switching network modules whose equivalent inputs for the connection of PCM lines for the incoming direction of transmission are each connected to one another, which moreover possesses a smaller number of outputs for the connection of PCM lines for the outgoing direction of transmission than inputs, and whose information memories possess a smaller storage capacity than correspond to the total number of PCM word intervals formed on the connected PCM lines for the incoming direction of transmission during each pulse frame, where the number of switching network modules is the quotient of the number of inputs and outputs of a switching network module. In all of the switching network modules, the random reading of the outgoing PCM words is controlled in such a manner that the time delay relative to the cyclic input of the incoming PCM words preferably lies within one time channel slot, and, consequently, the switching network unit operates in the main merely as a spatial switching stage.

The operational limitations, referred to above, of the PCM lines which can be connected to a switching network unit comprise, in particular, with regard to the random reading of the information memories of the switching network units, whereas substantially larger number of connections could be permitted in respect of the cyclic input. As, in the TDM switching network unit in accordance with the present invention, the individual modules possess a smaller number of outputs from which random reading takes place, than inputs via which the cyclic input takes place, the number of PCM lines for the incoming direction of transmission which are connected to the inputs of the switching network unit can be substantially greater than normal, since the module-individual memory control units need only operate a few PCM lines, and in an extreme case even only a single PCM line, for the outgoing direction of transmission. Nevertheless, the sum of the modules which form the switching network unit in accordance with the present invention represent an arrangement which ensures a blocking-free switch-through. The fact that the storage capacity of the individual information memories is smaller in respect of the incoming PCM words which can be supplied during each pulse frame via the PCM lines for the incoming direction of transmission means that the time channel conversion either is not possible at all or only to a limited extent, although, in accordance with the object of the invention, this does not represent a primary concern.

In accordance with another proposed realization of the invention in accordance with which TDM switching network units are again used in the switching network stages located between the input end and the output end switching network stages, which TDM switching network units produce both a time-wise and a spatial assignment of time channels, and therefore represent time-space switching network units, and which are likewise formed from a plurality of switching network modules, quite apart from the desired special features of the purely spatial switching function, the use of the spatial switching unit in accordance with the present invention in a switching network also results in a reduction in storage space.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a simplified block circuit diagram of a TDM switching network unit in accordance with the invention constructed of modules of the type illustrated in FIG. 1.

DESCRIPTION OF THE PREFERRED EMBODIMENTS

Figure 1:
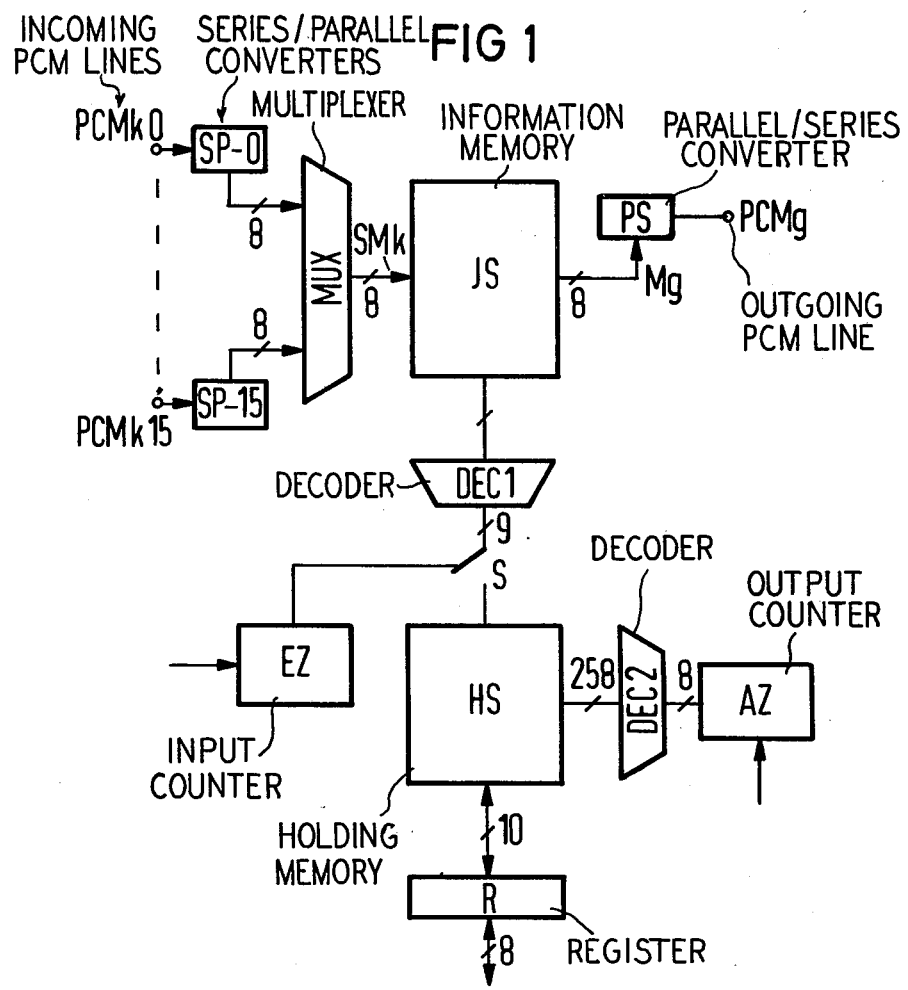
FIG. 1 is a schematic block diagram of a module as is used to construct the TDM switching network unit in accordance with the present invention.

The switching network modules illustrated in FIG. 1 are connected to 16 PCM lines for the incoming direction of transmission PCMk0---PCMk15 and to one PCM line for the outgoing direction of transmission PCMg. The access to the PCM lines for the incoming direction of transmission takes place via line-individual series/parallel converters SP0--SP15 by which the bits of the PCM words which occur in a serial manner on the PCM lines are converted into parallel form. Accordingly, the series/parallel converters each comprise 8 output lines.

The output lines of the series/parallel converters SP are connected to a multiplexer MUX which combines the PCM words occurring in parallel form on a super-multiplex line SMk which likewise possesses 8 line wires.

The super-multiplex line is connected to an information memory IS which has as many storage cells, each for one PCM word, as PCM lines for the incoming direction of transmission, therefore, 16 PCM word storage cells.

The input of the PCM words incoming on the PCM lines PCMk0---PCMk15 into the information memory IS takes place cyclically, for which purpose an input counter EZ supplies the corresponding drive addresses for the information storage cells by way of a decoder Dec1.

As indicated, the reading of the PCM words from the information memory IS takes place in a random manner. The appropriate drive addresses are supplied by a holding memory HS whose storage cells contain the drive addresses for the information memory IS. The storage cells of the holding memory HS are operated in a cyclic manner by an output counter AZ and by way of a decoder Dec2. By way of a switch S and the aforementioned decoder Dec1, they emit the aforementioned drive addresses to the speech memory IS which activate the storage cells thereof for the purpose of reading.

The PCM words read from the switch memory IS are firstly fed, in parallel form, by way of the 8-wire line Mg to a parallel/series converter PS and from there to a PCM line for the outgoing direction of transmission PCMg.

Further components of the switching network module illustrated in FIG. 1 comprise a register arrangement R which represents an interface to a switching network control unit, for example in the form of a μ-processor, from which, during the establishment of new connections, appropriate information memory addresses are input into the holding memory HS.

In accordance with FIG. 2, 16 of the switching network modules BS0---BS15 represented in FIG. 1 are combined to form a switching network unit in accordance with the present invention in that equivalent inputs for the connection of PCM lines for the incoming direction of transmission are connected to one another. This produces a switching network unit which can be connected to 16 PCM lines for the incoming direction of transmission and 16 PCM lines for the outgoing direction of transmission and which facilitates a block-free switch-through from each of the PCM lines for the incoming direction of transmission to each of the PCM lines for the outgoing direction of transmission. In the course of a connection of this kind, the PCM words incoming on the 16 connected PCM lines for the incoming direction of transmission are fed, during the sub-time interval of one time channel slot which they occupy on the super-multiplex lines SMk of the individual modules, into the storage cells, assigned to the sub-time intervals, of the information memories of all of the modules BS0--BS15. However, reading from the storage cells during the same time channel slot takes place only in one of the modules, namely in that module whose connected PCM line for the outgoing direction of transmission is to receive, by spatial switch-through, the PCM word in question, which is achieved in that only that holding memory HS assigned to this module contains, in its storage cell assigned to the relevant time channel, a drive address for the storage cell in question which contains the relevant PCM word in the information memory.

In contrast to the described additions, the individual memories and modules can also be designed in such a manner that they are connected to a plurality of PCM lines for the outgoing direction of transmission, in which case a demultiplexer is additionally required at the output end in order to distribute the read PCM words from a super-multiplex line corresponding to the line Mg upon which all the PCM words are fed to the connected PCM lines. In this case, fewer switching network modules are needed, the number of the same representing the quotient of the number of inputs and outputs of the switching network module. On the other hand, in this case, the holding memories must be able to supply a correspondingly-greater number of drive addresses during each pulse frame, and thus must possess a correspondingly greater storage capacity.

As regards the use of such switching network units in switching networks which also contain switching network units which serve fully both for the time-wise switching and spatial switching and which, in accordance with a proposed realization, likewise comprise a plurality of such modules, in the interest of uniformity of type, the number of storage cells within the information memories can exceed the number of connected PCM lines, so that to a lesser extent it is still possible to effect time channel conversions, whereby a possible danger of blockage can be countered. The underdimensioning of the storage capacity of the information memories which then still exists in this case results from the fact that PCM lines are connected upon which PCM words occur with a higher transmission frequency.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A time division multiplex switching network unit for the connection of a plurality of pulse code modulation lines which effects an assignment of time channels used for incoming pulse code modulation lines to time channels used for outgoing pulse code modulation lines by the cyclic input into storage of incoming pulse code modulated words and a corresponding delayed reading of the outgoing pulse code modulated words by random access, comprising: a plurality of identical switching network modules each comprising
    a plurality of inputs each of which corresponds to a like input of each other module for connection to a respective incoming pulse code modulation line,
    an information memory having a smaller storage capacity than corresponds to the total number of pulse code modulation word time intervals formed during each pulse frame on the incoming pulse code modulation lines,
    series/parallel conversion means connected to said inputs,
    multiplexing means connected between said series/parallel conversion means and said information memory,
    an output for connection to an outgoing pulse code modulation line,
    parallel/series conversion means connected between said information memory and said output, and
    drive means connected to said information memory for operating said information memory to cyclically receive incoming pulse code modulation words from said multiplexing means and to output pulse code modulation words by random access with a time delay to said parallel/series conversion means, the time delay being relative to the cyclic input and within one time channel slot so that said switching network unit operates as a spatial switching unit,
the number of said switching network modules being the quotient of the number of inputs and outputs of a single switching module.

2. The time division multiplex switching network unit of claim 1, wherein each of said drive means comprises: an input counter operated by control pulses; and a decoder connected between said input counter and said information memory to decode the counts as drive addresses.

3. The time division multiplex switching network of claim 1, wherein each of said drive means comprises:
    a holding memory for storing addresses;
    a first decoder connected between said holding memory and said information memory for decoding the held addresses as drive addresses for said information memory;
    an output counter operated by control pulses; and
    a second decoder connected between said output counter and said holding memory for decoding the counts as drive addresses for said holding memory.

4. The time division multiplex switching network of claim 3, and further comprising:
    means operable to load addresses into said holding memory.

5. The time division multiplex switching network of claim 1, wherein each of said drive means comprises:
    a holding memory for storing drive information for said information memory;
    means for loading the drive information into said holding memory;
    an input counter operated by control pulses:
    a first decoder connected to said information memory;
    switch means operable to alternately connect said input counter and said holding memory so that the count and the drive information are alternately decoded as drive addresses for said information memory;
    an output counter operated by control pulses; and
    a second decoder connected between said output counter and said holding memory for decoding the counts as drive addresses for said holding memory.

* * * * *